Patented Sept. 15, 1931

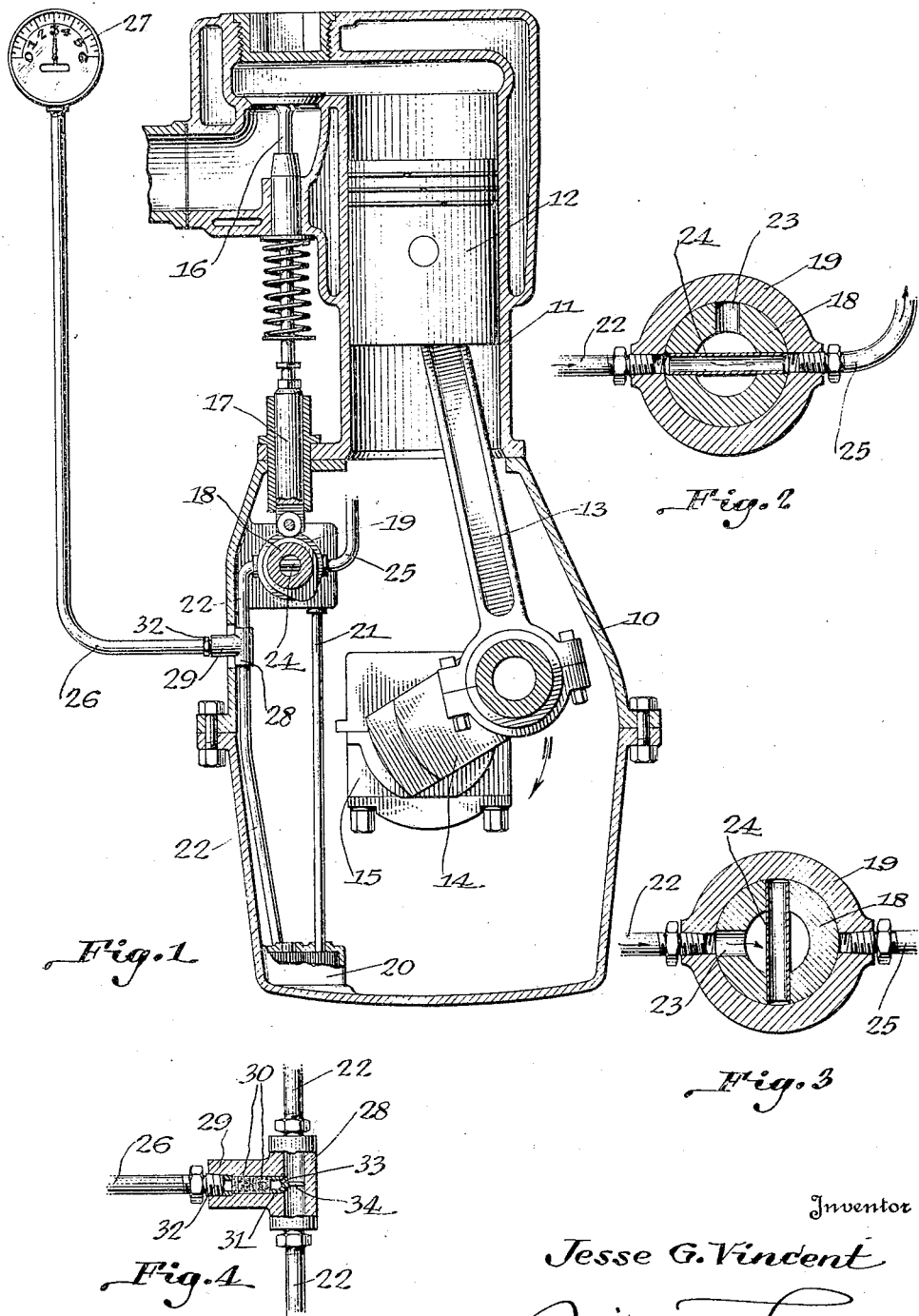

1,823,714

UNITED STATES PATENT OFFICE

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN

INTERNAL COMBUSTION ENGINE

Application filed September 23, 1925. Serial No. 57,987.

This invention relates to internal combustion engines and particularly to the lubrication mechanism thereof.

One of the objects of the invention is to provide the oil circulation system with means for dampening pulsations therein.

Another object of the invention is to provide a rotary distributor for the oil for several parts of the motor whereby the oil may be delivered in measured quantities.

Another object of the invention is to provide means for intermittently feeding oil to a motor bearing and for damping out the pulsations in a branch line caused by said intermittent feed.

Other objects of the invention will appear from the following description taken in connection with the drawings, which form a part of this specification, and in which:

Fig. 1 is a vertical section through an internal combustion engine embodying the invention;

Fig. 2 is an enlarged detail section through the cam shaft bearing of the engine shown in Fig. 1;

Fig. 3 is a view similar to Fig. 2 with the cam shaft in another position, and

Fig. 4 is an enlarged detail view of the pulsation dampening means.

Referring to the drawings, an internal combustion engine is shown comprising a two-part crank case 10, a cylinder block 11 mounted thereon, a piston 12, connecting rod 13, a crank shaft 14 mounted in bearings 15, a valve 16, a valve push rod 17, and a cam shaft 18 mounted in a bearing 19. An oil pump 20 is mounted in the lower part of the crank case 10 and is arranged to be driven by a shaft 21 having a suitable geared connection, not shown, with the cam shaft 18.

The oil pump 20 draws oil from the lower part of the crank case 10 and delivers it to the various bearings of the motor, from which bearings the oil falls into the crank case where it is again picked up and circulated by the pump. While the outlet pipe 22 of the pump may run to the various bearings of the motor, such as the crank shaft bearing and others, it is shown as connected only to the cam shaft bearings. One of these bearings has been described above as indicated at 19. An enlargement of this bearing is shown in Figs. 2 and 3, and the cam shaft 18 is also shown therein. The cam shaft is hollow so that the oil fed into it from the pipe 22 will be led to the other bearings of the cam shaft by suitable radial openings. In the zone of the connection of the pipe 22, the cam shaft 18 is provided with a radial opening 23 which thereby registers with the pipe 22 at each revolution of the cam shaft. Additional openings may be provided, if it is desired that more oil be fed to the cam shaft.

In order that the cam shaft may also act as a distributor or metering device for other bearings of the engine, it is provided with a pipe 24 which extends completely across the cam shaft, also in the zone of the pipe 22. At the opposite side of the bearing 19 there is a pipe 25 which leads to other bearings of the motor that require oil, and it will be seen that at each half revolution of the cam shaft 18 the pipe 24 will connect the pipe 22 with the pipe 25 and thereby feed oil to the latter without any such oil going into the cam shaft 18.

From the above description it is evident that with a steady pressure of oil supplied by the pump 20 through the pipe 22, the intermittent connection of the pipe 22 with the radial opening 23 of the cam shaft and the pipe 24 therein will necessarily cause a pulsation of the oil in the pipe 22. That is, there will be a lessening and an increasing of the pressure on the oil. It is intended that this oil pressure shall be indicated to the operator of the engine, and for this purpose a pipe 26 connects with an oil gage 27, shown in Fig. 1. Due to the pulsations above described, the pressure on the oil gage fluctuates and makes it difficult to read. More important, however, is the fact that such pulsations cause a disagreeable noise in the oil line which, when the engine is used on an automobile, is a very serious objection.

Provision is made, therefore, for damping out these pulsations in the oil pipe 22 so that they will not be communicated to the branch pipe 26 or the gage 27, and this is done by providing dampening means in the T connection 28 between the pipe 22 and the pipe 26. As shown in Fig. 4, the stem 29 of the connection 28 provides a housing for several felt disks 30 which are arranged between a hollow plug 31 and a hollow threaded connection 32 to which the pipe 26 is attached. The plug 31 is provided with openings 33 through which the oil communicates with the felt disks 30, and a pin 34 on the plug 31 positions the latter in the connection. The pin 34 is small so that it does not interfere with the passage of oil through the connection 28.

By the above construction it is evident that some oil will pass through the felt disks 30 and into the pipe 26 until the latter is filled and the pressure therein will be indicated on the gage 27, but the rapid rise and fall of pressure, that is, the pulsations, will not be immediately transferred to the pipe 26. In other words there pulsations will be damped out by the felt disks in the connection 28 so that the hammering noise that would otherwise be conveyed to the pipe 26 will be entirely eliminated.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In an internal combustion engine, the combination of a bearing, a hollow shaft therein, said bearing having a radial inlet conduit and a directly opposite outlet conduit and said shaft having a radial opening adapted to register with and receive oil from the inlet conduit, and a transversely extending duct in said shaft adapted to simultaneously register with both said radial conduits to carry oil from one to the other.

2. In an internal combustion engine, the combination of a bearing, a hollow shaft therein, said bearing having a radial inlet conduit and a directly opposite outlet conduit and said shaft having a radial opening to register with and receive oil from the inlet conduit, and a transversely extending pipe in said shaft arranged at an angle to said opening and adapted to simultaneously register with both said conduits to carry oil from one to the other.

3. In an internal combustion engine, the combination of a bearing, a hollow shaft therein, means for feeding oil to said bearing, said bearing having an inlet conduit and an outlet conduit leading to another bearing, and means in said shaft to receive oil from said inlet conduit at one point in the revolution of said shaft and additional means to transfer oil from the inlet to the outlet conduit at another point in said revolution.

4. An oil pulsation dampener comprising a T pipe connection, having a main channel and a branch channel, a perforated abutment in said branch channel having a stop piece extending to the opposite wall of the main channel, felt packing in the branch channel against said abutment, and a pipe connection threaded into the branch channel against said packing, for the purpose described.

5. In an internal combustion engine, the combination of a bearing, a hollow shaft therein, said bearing having an inlet conduit and an outlet conduit, with means for alternately feeding oil into and across the hollow shaft, comprising a port between the outer walls and inner walls of the shaft adapted to register with and admit oil into said shaft from said inlet conduit and means in said shaft adapted to operatively connect said conduits.

6. A lubricating system for an internal combustion engine comprising a bearing having oppositely disposed openings, a hollow shaft in the bearing having an opening from the outside to the inside wall adapted to register with the openings in the bearing and a pipe extending through the shaft adapted to connect the openings in the bearing to alternately conduct oil into the shaft and from one to the other of the oppositely disposed openings.

7. A lubricating system comprising a bearing having oppositely disposed openings, a hollow shaft in the bearing having a radial opening connecting the opening within the shaft with the surface thereof adapted to register with the openings in the bearing and a pipe extending diametrically through the shaft adapted to connect the openings in the bearing to alternately conduct oil into the shaft and from one to the other of the oppositely disposed openings.

8. A lubricating system for an internal combustion engine comprising a bearing having openings adapted to be connected, a hollow shaft in the bearing having a radial opening adapted to register with at least one of the openings in the bearing and a pipe extending through the shaft adapted to connect the openings in the bearing whereby lubricant is alternately fed into the shaft from one of the openings in the bearing and across the shaft into the other opening.

9. A lubricating system for an internal combustion engine comprising a plurality of bearings each having openings adapted to be connected, a hollow shaft having a plurality of radial openings each adapted to register with at least one of the openings in one of the bearings and a plurality of pipes extending through the shaft adapted to connect the openings in each of the bearings whereby oil is fed alternately into the shaft and across the shaft.

In testimony whereof I affix my signature.

JESSE G. VINCENT.